United States Patent
Desrochers et al.

(10) Patent No.: US 6,850,184 B1
(45) Date of Patent: Feb. 1, 2005

(54) FORECASTED RADAR MOSAICS

(75) Inventors: George Rene Desrochers, Georgetown, MA (US); Paul Joseph Bayer, Arlington, MA (US); Brenda Joyce Roder, Chelmsford, MA (US); Michael Robert Kleist, Nashua, NH (US)

(73) Assignee: WSI Corporation, Billerica, MA (US)

( * ) Notice: Subject to any disclaimer, the term of this patent is extended or adjusted under 35 U.S.C. 154(b) by 0 days.

(21) Appl. No.: 10/430,168

(22) Filed: May 5, 2003

(51) Int. Cl.[7] ........................ G01S 13/00; G01S 13/02
(52) U.S. Cl. .................... 342/26 D; 342/179; 342/460
(58) Field of Search ........................... 342/26 A–26 D, 342/26, 179, 460; 702/2, 3, 4

(56) References Cited

U.S. PATENT DOCUMENTS 5,959,567 A * 9/1999 Wolfson et al. .............. 342/26
5,974,360 A * 10/1999 Otsuka et al. ................ 702/3
6,018,307 A * 1/2000 Wakayama et al. ......... 342/26
6,128,578 A * 10/2000 Sakaino et al. ............... 702/3
6,340,946 B1 * 1/2002 Wolfson et al. ............. 342/26
6,405,134 B1 * 6/2002 Smith et al. ................. 702/4

* cited by examiner

*Primary Examiner*—Bernarr E. Gregory
*Assistant Examiner*—Brian Andrea
(74) *Attorney, Agent, or Firm*—Woodcock Washburn LLP

(57) ABSTRACT

A system and method to build a radar reflectivity forecast mosaic from a collection of radar sites. The radar data from multiple radar sites is processed to create movement information for all of the precipitation areas. The movement information and precipitation areas are then mosaicked in a common geographical framework to create forecasted radar reflectivity mosaics. By using the reflectivity information and movement information from multiple radars, a wider scale, more coherent radar forecast can be generated.

30 Claims, 3 Drawing Sheets

FORECASTED RADAR MOSAICS

FIELD OF THE INVENTION

The present invention is directed to weather forecasting and, in particular, a method of producing a composite forecasted radar mosaic.

BACKGROUND OF THE INVENTION

Weather forecasting of storms and other meteorological events is extremely important to aviation, emergency response agencies, utilities and other entities that provide for public safety and welfare. Techniques have been devised to create short term forecasts of radar reflectivity by processing data from a single radar site. Such techniques track clusters or cells to predict storm motion by correlating cells in two or more successive images to determine speed and direction of a storm front. This movement information is then used to project where the precipitation areas are likely to be located in the next thirty to sixty minutes which is represented in the form of forecasted radar reflectivity images.

Often, however, the direction of cells is different than the direction of the storm front. This occurs particularly in thunderstorms, where the accuracy of predicting the motion of the storm front is poor. Thus, it is possible that a single site's radar reflectivity information may provide inaccurate forecasts. Further, where more than one radar site is tracking a storm front, it is possible that each of the radar sites may provide different and conflicting forecasts.

Thus, in view of the above, there is a need for a system that can generate more accurate forecasted radar reflectivity images. There is a further need for a system that can make use of radar reflectivity information from multiple radar sites. The present invention provides such a system.

SUMMARY OF THE INVENTION

The present invention provides a system that extends these techniques of the prior art to build a radar reflectivity forecast mosaic from a collection of radar sites. The radar data from multiple radar sites is processed to create movement information for all of the precipitation areas. The movement information and precipitation areas are then mosaicked in a common geographical framework to create forecasted radar reflectivity mosaics. By using the reflectivity information and movement information from multiple radars, a wider scale, more coherent radar forecast can be generated.

In accordance with an aspect of the invention, there is provided systems and methods of providing a forecasted radar mosaic. A radar database stores radar reflectivity information from radar sites, and a radar advection processor receives the radar reflectivity information and processes the radar reflectivity information to determine track vectors and forecasted radar reflectivity information. A radar mosaicking processor receives the processed radar reflectivity information and builds the forecasted radar mosaic, where the forecasted radar mosaic includes radar reflectivity information from predetermined ones of the radar sites.

In accordance with a feature of the invention, the radar mosaicking processor may transform the forecasted radar reflectivity information for the predetermined ones of the radar sites into a remapped graphic image for a predetermined forecast time of interest. The radar mosaicking processor may transform the forecasted radar reflectivity information for the predetermined ones of the radar sites in accordance with at least one of a map projection, a domain and a resolution. The remapped graphic image for the predetermined ones of the plurality of radar sites may be merged into the forecasted radar reflectivity mosaic. In addition, corresponding pixels in each transformed forecasted radar reflectivity information of the predetermined ones of the plurality of radar sites may be examined such that the highest reflectivity level from the remapped graphic images is selected and inserted into the forecasted radar reflectivity mosaic.

In accordance with another feature of the invention, the radar mosaicking processor may apply merged track vectors to an observed radar reflectivity mosaic to generate the forecasted radar mosaic. The radar mosaicking processor may also generate a time synchronized observed/forecasted radar reflectivity imagery for the predetermined ones of the radar sites by applying track vectors for the predetermined ones of the radar sites to a corresponding recent observed radar reflectivity image. A nominal time for the observed radar reflectivity mosaic may be selected, and a time difference between an observed time for each of the predetermined ones of the radar sites and the nominal time for the observed radar reflectivity mosaic determined for each of the predetermined ones of the radar sites. Inverted track vectors for the predetermined ones of the radar sites may be formed using the time differences and applied to the observed radar reflectivity images. The transformed observed radar reflectivity images may be transformed into a common map projection and merged into a time synchronized observed/forecasted radar reflectivity mosaic. Further, a time for the forecasted radar mosaic may be selected and a time difference from the observed time and the forecast time is determined. Also, inverted track vectors may be constructed for the predetermined ones of the radar sites, and the transformed track vectors merged into one set of track vectors for the entire domain of the radar reflectivity mosaic. The inverted track vectors may be applied to the observed radar reflectivity mosaic for the most recent time to generate the forecasted radar reflectivity mosaic.

In accordance with yet another aspect of the invention, there is provided a method of generating weather forecasting information that includes: receiving radar data from a plurality of radar sites, generating a track vectors for each of the radar sites, and merging the track vectors for each of the radar sites into a forecasted radar image mosaic.

According to a feature of the invention, a corresponding pixel for observed weather radar images having a highest value for each radar site may be selected, and the selected pixel is used in the forecasted radar image mosaic.

According to another feature of the invention, a time coherent mosaic is created to synchronize the radar sites.

According to yet another feature, the track vectors are merged into a single set of track vectors; the single set of track vectors are applied to the forecasted radar image mosaic.

These and other aspects of the present invention will be described in the following detailed description of the invention.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, in which like references numerals represent similar parts throughout the several views of the drawings, it being understood, however, that the invention is not limited to the specific methods and instrumentalities disclosed. In the drawings.

DETAILED DESCRIPTION

Figure 1:
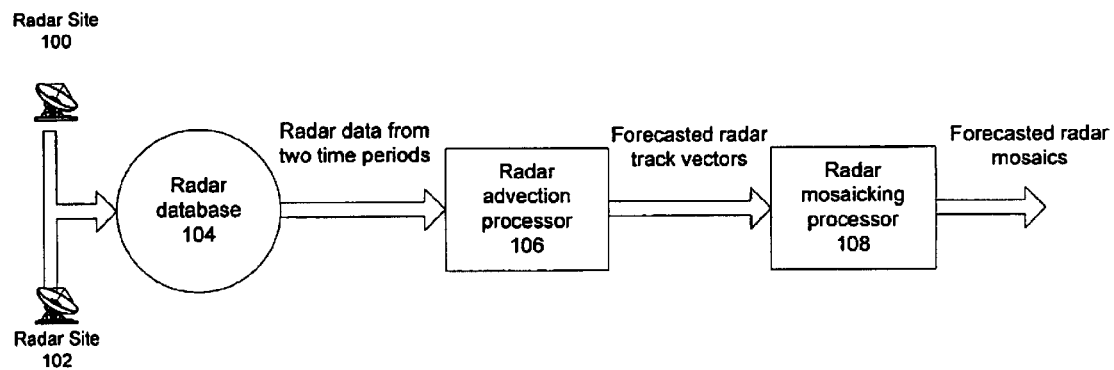
FIG. 1 illustrates an overview of the system of the present invention.

In accordance with the present invention, radar reflectivity information from multiple sites is used to create a forecasted radar mosaic. This advantageously provides a more accurate forecasted radar picture that is a better predictor of future weather than conventional systems that utilize a single radar site's data to generate a forecasted radar picture. Referring now to FIG. 1, there is an overview of the system of the present invention. Radar sites 100 and 102 periodically obtain radar reflectivity information regarding a particular location under observation. The radar information from the sites 100 and 102 is forwarded to a radar processing facility and stored in a database 104. The database 104 stores observed radar reflectivity information for at least two time periods.

Typically, radar images are produced by radar sites at a rate of approximately 10 images per hour. This frequency is inadequate to measure rain cell movement during fast moving storms because of the gaps between images. To determine rain cell movement, a radar advection processor 106 uses pattern recognition to determine how precipitation has moved in the recent past and as a means to predict how the precipitation will move in the near future.

As an exemplary embodiment, the radar advection processor 106 may comprise an apparatus and use a method such as that disclosed in U.S. Pat. No. 5,959,567 "Method and Apparatus for Tracking of Organized Storms," which is incorporated herein by reference in its entirety. The radar advection processor may include a filter module, a tracker module and an advection module to generate a predicted weather radar image. An image filter is applied to each pixel in a particular weather radar image for a series of elliptical template orientations defined by an incremental rotation angle. For example, an increment of 10° can be used, which results in 18 different elliptical template orientations. The image filter is designed to return a large value when the underlying image nearly matches the elliptical template. The maximum value at each pixel resulting from the application of all orientations of the template is determined.

Once the image filter has been applied to each weather radar image, the resulting filtered image is passed to the tracker module. An array of track vectors describing the local motion of the storm occurring during the time interval between images is generated by the tracker module, by correlating a local subimage of a prior filtered image with a subimage of a more recent filtered image. The track vectors are then applied by a propagation module to the unfiltered weather radar image to generate a predicted weather radar image of the organized storm. The present invention is not limited to the above process as other processes to generate the forecasted radar data may be used.

The forecasted radar data is then processed by a radar mosaic processor 108 that builds a forecasted radar mosaic from the set of single site forecasted radar data and track vectors. In accordance with the present invention, many methods may be used to create the mosaic.

Figure 2:
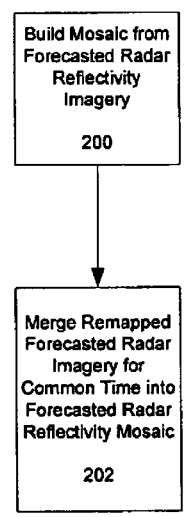
FIG. 2 is a flow chart of the process performed to build a forecasted radar mosaic.

Referring now to FIG. 2, according to a first method, the radar mosaic processor 108 may build a mosaic from the forecasted radar reflectivity imagery as follows. At step 200, the forecasted radar reflectivity information is transformed for each site into a common map projection for each forecast time of interest. This process is known as "remapping" and the resulting graphic image is a "remapped" graphic image. To transform each site, a map projection (e.g. Lambert Conformal), domain (e.g. the continental US) and a resolution (e.g. 1 km per pixel) for the forecasted radar mosaic is selected.

A graphic image representation of the radar data is constructed in the map projection, domain, and resolution of the forecasted radar mosaic for each radar for the forecast time of interest. The latitude and longitude are calculated for each pixel in each remapped graphic image. Using the earth location information for the radar, the forecasted radar reflectivity for that latitude and longitude is determined and the determined forecasted radar reflectivity value is placed in the pixel identified above.

Next, at step 202, the remapped forecasted radar reflectivity imagery for a common time is merged into a forecasted radar reflectivity mosaic. The corresponding pixels in each of the remapped graphic images for the time period are examined for each pixel in the radar mosaic. The highest reflectivity level (other methods can be used) from the remapped graphic images is selected and inserted into the radar reflectivity mosaic.

Figure 3:
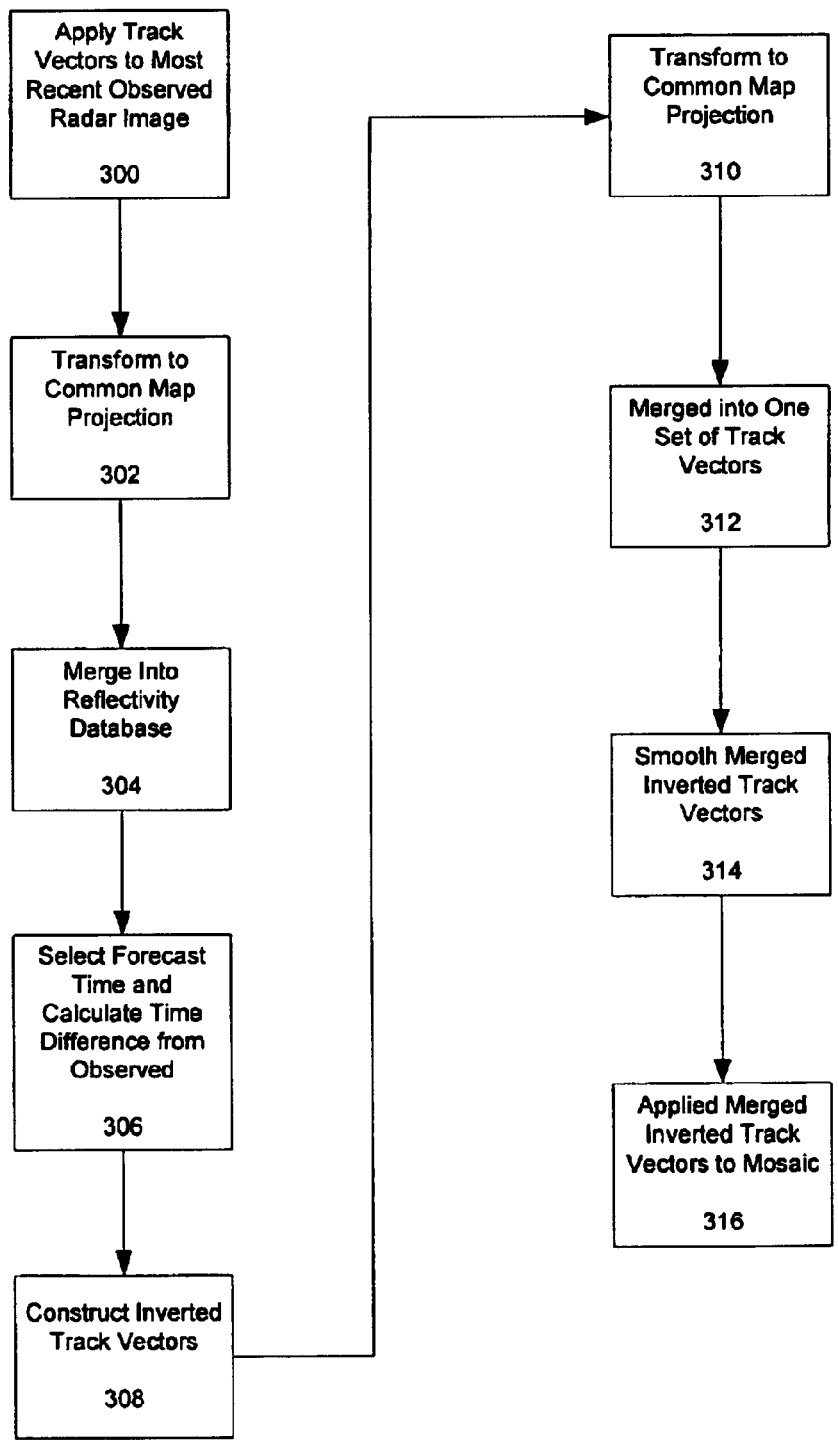
FIG. 3 is a flow chart of an alternate process performed to build a forecasted radar mosaic.

In accordance with another method for creating the mosaic, the radar mosaic processor 108 applies merged projection/track vectors for the radar sites to an observed radar reflectivity mosaic. Referring now to FIG. 3, in this method, step 300 is optional wherein the track vectors for each radar site are applied to the most recent corresponding observed radar reflectivity imagery to generate a time synchronized observed/forecasted radar reflectivity image for each radar site. Step 300 may be desirable because each radar site to be included in the mosaic may be operating on its own schedule. In particular, if an observed radar mosaic is to be constructed for a specified time, it is possible that some of the radars contributing to the mosaic collected data up to several minutes prior to the specified time. Thus, applying the track vectors for the time period between the actual observation time and the specified mosaic time may have the desired effect of "synchronizing" the reflectivity information from the various radar sites to create a "time coherent" observed radar reflectivity mosaic.

The process at step 300 is as follows. The nominal time for the observed radar reflectivity mosaic is selected, such as the observation time for the most recent radar reflectivity information to be included in the observed mosaic. Next, the time difference between the observation time for that radar site and the nominal time for the observed radar reflectivity mosaic is determined for each radar site. The radar reflectivity information is projected forwarded by the time difference determined above for each radar site by using the time difference identified above and the track vectors for the radar site to size and invert the track vectors. The resulting set of vectors indicates where various pixels of the projected forward radar image are in the observed radar image.

Using a method such as Barnes, Cressman, or nearest neighbor, a vector for each pixel of the projected forward radar image is created that indicates which pixel to select from the observed radar image. The set of vectors created above are applied to generate a time synchronized/forecasted radar image from the observed radar image.

Figure 4:
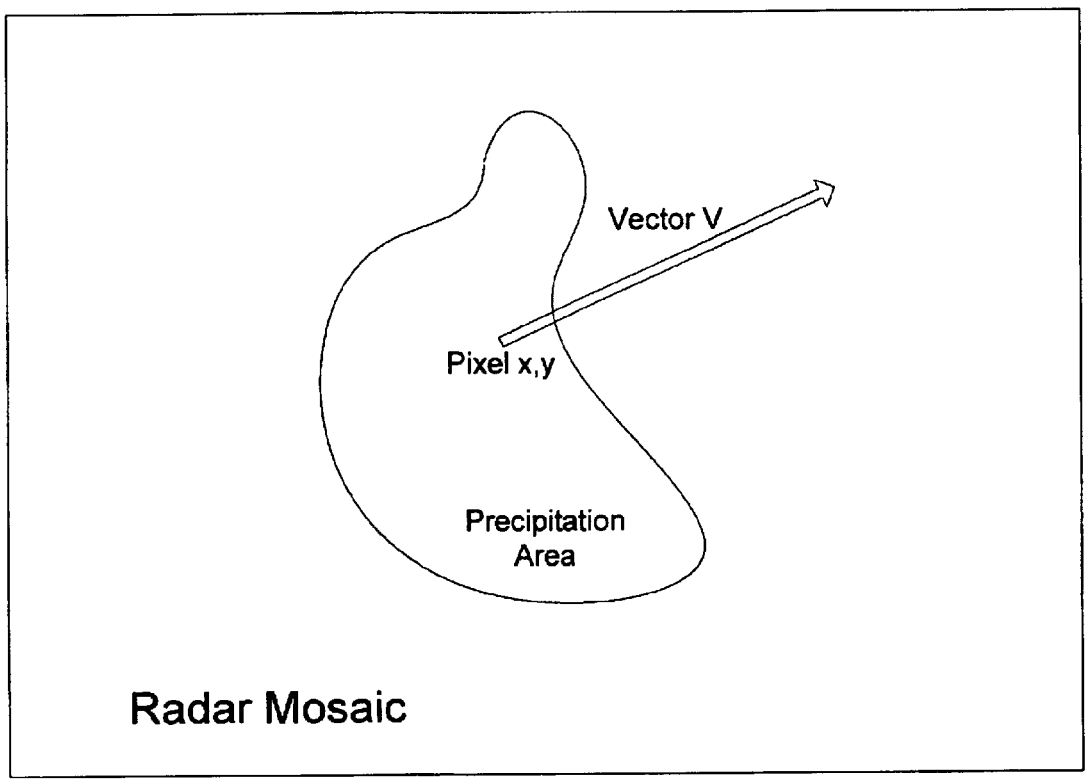
FIG. 4 is an overview illustrating the determination of an inverted track vector.

Referring now to FIG. 4, there is illustrated an overview of how the inverted track vector is determined. At various pixels in the most recent observed radar image, radar mosaic, or time coherent radar mosaic, there is a vector that indicates the speed and direction that the precipitation area represented by the pixel is estimated to be moving. These vectors taken collectively are referred to as "track vectors."

Vector V is a two dimensional vector that describes the motion of pixel x, y over time.

$V=(i,j)$ where the units of i and j are pixels/hour.

T is the time of the most recent observed radar image, radar mosaic or time coherent radar mosaic in hours from a reference time. T' is the time of the forecasted radar image or radar mosaic in hours from the same reference time.

$\Delta T = T' - T$

V' is the inverted track vector for vector V, where x', y' are the coordinates of the pixel to be associated with V' and time T'.

$x' = x + (i * \Delta T)$
$y' = y + (j * \Delta T)$
$V'(-i, -j)$

Those skilled in the art will recognize that these calculations could also be performed in the meters of Northing and Easting coordinate space associated with the map projection.

Referring again to FIG. 3, at step 302, the observed (or forecasted if the "time coherent" process of step 300 is used) radar reflectivity imagery for the most recent time for each site is transformed into a common map projection. A process such as described in step 200 may be used at step 302. At step 304, the transformed radar reflectivity imagery for the most recent time is merged into a radar reflectivity mosaic. A process similar to that of step 202 may be used at step 304.

At step 306, the forecast time for the forecasted radar mosaic is selected and the time difference from the observed time and the forecast time is calculated. Using the time difference calculated at step 306, a set of inverted track vectors is constructed for each radar site (step 308). A process such as that described with regard to FIG. 4 in step 300 may be used at step 308. At step 310, each set of track vectors is transformed into the common map projection.

At step 312, the transformed track vectors are merged into one set of track vectors for the entire domain of the radar reflectivity imagery. Well known methods such as first in, last in, the vector associated with the highest reflectivity level, or the vector resulting from the strongest correlation may be used in step 312. A method such as Barnes, Cressman, or nearest neighbor may be used to assure that there is an inverted track vector for each pixel in the domain of the forecasted radar mosaic. Step 314 is optional, wherein the merged inverted track vectors are smoothed using a method such as two-dimensional matrix filter. At step 316 the merged inverted track vectors are applied to the radar reflectivity mosaic for the most recent time to generate the forecasted radar reflectivity mosaic. The present invention is not limited to the above process of FIGS. 2 and 3 as other processes to generate the forecasted radar reflectivity mosaic may be used.

The above methods have been provided for exemplary purposes only. Various modifications of the invention, in addition to those described herein, will be apparent to those of skill in the art in view of the foregoing description. Such modifications are also intended to fall within the scope of the appended claims.

What is claimed:

1. A system for providing a forecasted radar mosaic, comprising:

a radar database that stores radar reflectivity information from radar sites;

a radar advection processor that receives the radar reflectivity imagery information and processes the radar reflectivity imagery to determine track vectors and forecasted radar reflectivity information; and a radar mosaicking processor that receives the processed radar reflectivity information and builds said forecasted radar mosaic, said forecasted radar mosaic including radar reflectivity information from predetermined ones of said radar sites.

2. The system of claim 1, wherein said radar mosaicking processor transforms the forecasted radar reflectivity information for said predetermined ones of said radar sites into a remapped graphic image for a predetermined forecast time of interest.

3. The system of claim 2, wherein said radar mosaicking processor transforms the forecasted radar reflectivity information for said predetermined ones of said radar sites in accordance with at least one of a map projection, a domain and a resolution.

4. The system of claim 2, wherein the remapped graphic image for the predetermined ones of said plurality of radar sites is merged into said forecasted radar reflectivity mosaic.

5. The system of claim 4, wherein corresponding pixels in each transformed forecasted radar reflectivity information of the predetermined ones of said plurality of radar sites are examined, and wherein the highest reflectivity level from the remapped graphic images is selected and inserted into the forecasted radar reflectivity mosaic.

6. The system of claim 1, wherein a nominal time for the observed radar reflectivity mosaic is selected, and a time difference between the observation time for each radar site and said nominal time for the observed radar reflectivity mosaic is determined for each radar site.

7. The system of claim 6, wherein said radar reflectivity information is projected forward by said time difference determined for each radar site using said track vectors to create a set of inverted track vectors.

8. The system of claim 7, wherein a vector for each pixel of the projected forward radar data is created that indicates which pixel to select from the observed radar image, and wherein said inverted track vectors are applied to generate a time synchronized/forecasted radar image from the observed radar image.

9. The system of claim 1, wherein said radar reflectivity imagery information for a most recent time for each radar site is transformed into a common map projection.

10. The system of claim 9, wherein said transformed radar reflectivity imagery for said most recent time is merged into a radar reflectivity mosaic.

11. The system of claim 10, wherein a forecast time for said forecasted radar mosaic is selected and a time difference from the observed time and the forecast time is calculated, and wherein a set of inverted track vectors is constructed for each radar site.

12. The system of claim 11, wherein each set of track vectors is transformed into said common map projection, and wherein transformed track vectors are merged into one set of track vectors for the entire domain of the radar reflectivity imagery.

13. The system of claim 12, wherein merged inverted track vectors are applied to said radar reflectivity mosaic for said most recent time to generate said forecasted radar mosaic.

14. A method for providing a forecasted radar mosaic, comprising:

storing radar reflectivity information from radar sites;

receiving the radar reflectivity information and processing the radar reflectivity information to determine track vectors and forecasted radar reflectivity information; and receiving the processed radar reflectivity information and building said forecasted radar mosaic, said forecasted radar mosaic including radar reflectivity information from predetermined ones of said radar sites.

15. The method of claim 14, further comprising transforming the forecasted radar reflectivity information for said predetermined ones of said radar sites into a remapped graphic image for a predetermined forecast time of interest.

16. The method of claim 15, further comprising said radar mosaicking processor transforms the forecasted radar reflectivity information for said predetermined ones of said radar sites in accordance with at least one of a map projection, a domain and a resolution.

17. The method of claim 16, further comprising merging the remapped graphic image for the predetermined ones of said plurality of radar sites into said forecasted radar reflectivity mosaic.

18. The method of claim 17, further comprising:

examining corresponding pixels in each transformed forecasted radar reflectivity information of the predetermined ones of said plurality of radar sites; and selecting the highest reflectivity level from the remapped graphic images and inserting the highest reflectivity level into the forecasted radar reflectivity mosaic.

19. The method of claim 14, further comprising selecting a nominal time for the observed radar reflectivity mosaic; and determining a time difference between the observation time for each radar site and said nominal time for the observed radar reflectivity mosaic for each radar site.

20. The method of claim 19, further comprising projecting forward by said time difference determined for each radar site using said track vectors to create a set of inverted track vectors.

21. The method of claim 20, further comprising creating a vector for each pixel of the projected forward radar data that indicates which pixel to select from the observed radar image; and applying said inverted track vectors to generate a time synchronized/forecasted radar image from the observed radar image.

22. The method of claim 14, further comprising transforming said radar reflectivity imagery information for a most recent time for each radar site into a common map projection.

23. The method of claim 22, further comprising merging said transformed radar reflectivity imagery for said most recent time into a radar reflectivity mosaic.

24. The method of claim 23, further comprising selecting a forecast time for said forecasted radar mosaic and calculating a time difference from the observed time and the forecast time; and constructing a set of inverted track vectors for each radar site.

25. The method of claim 24, further comprising transforming each set of track vectors into said common map projection; and merging the transformed track vectors into one set of track vectors for the entire domain of the radar reflectivity imagery.

26. The method of claim 25, further comprising applying the merged inverted track vectors to said radar reflectivity mosaic for said most recent time to generate said forecasted radar mosaic.

27. A method of generating weather forecasting information, comprising:

receiving radar data from a plurality of radar sites;

generating track vectors for each of the radar sites; and merging the track vectors for each of the radar sites into a forecasted radar image mosaic.

28. The method of claim 27, further comprising:

selecting a corresponding pixel for observed weather radar images having a highest value for each radar site; and using the selected pixel in the forecasted radar image mosaic.

29. The method of claim 27, further comprising creating a time coherent mosaic to synchronize the radar sites.

30. The method of claim 27, further comprising:

merging the track vectors into a single set of track vectors; and applying the single set of track vectors to the forecasted radar image mosaic.

* * * * *